United States Patent Office 3,475,303
Patented Oct. 28, 1969

3,475,303
ELECTROCHEMICAL MACHINING USING PRESSURIZED ELECTROLYTE TO ACTUATE A WORK SUPPORT
Brian Sadler and Trevor Ironmonger, Derby, England, assignors to Rolls-Royce Limited, Derby, England, a British company
Filed Dec. 13, 1965, Ser. No. 513,311
Claims priority, application Great Britain, Feb. 12, 1965, 6,290
Int. Cl. B23p 1/16
U.S. Cl. 204—143                8 Claims

ABSTRACT OF THE DISCLOSURE

A method or apparatus for electrolytically machining a workpiece in which the pressurized electrolyte is fed simultaneously to the machining gap between the electrodes and to a piston-and-cylinder unit to clamp the workpiece into position. Stopping the supply of the electrolyte automatically removes the clamping force.

---

This invention concerns improvements in or relating to electrolytic machining.

Clamping of workpieces, electrodes or members which effect electrical contact therewith in electrolytic machining can be time-consuming if conventional clamping means such as bolts are employed. This is undesirable, particularly in production work.

According to the present invention in one aspect, there is provided a method of electrolytically machining a workpiece in which electrolyte is supplied to a space between two electrodes, one of which is constituted at least in part by the workpiece, electrolytically connecting said electrodes to a source of electrical power so as to supply a working current thereto, supplying electrolyte under pressure via a first conduit means to the space between the electrodes and supplying electrolyte under pressure via a second conduit means to a clamping means so as to clamp one of said electrodes in a predetermined position.

In another aspect, the present invention provides electrolytical machining apparatus comprising two electrodes spaced apart so as to define a machining gap therebetween, one of said electrodes including a work support and being constituted at least in part by the workpiece, means for electrically connecting said electrodes to an electrical power source for supplying, in operation, a working current thereto, first conduit means for supplying electrolyte under pressure to said machining gap, clamping means for clamping one of said electrodes in a predetermined position, pressure responsive means responsive to the pressure of the electrolyte, second conduit means separate from said first conduit means, for supplying electrolyte under pressure to said pressure responsive means so as to actuate in operation the said clamping means, in response to said pressure of the electrolyte.

The present invention enables the clamping operation to be carried out automatically by employing the pressure of the electrolyte to effect clamping.

Figure 1A:
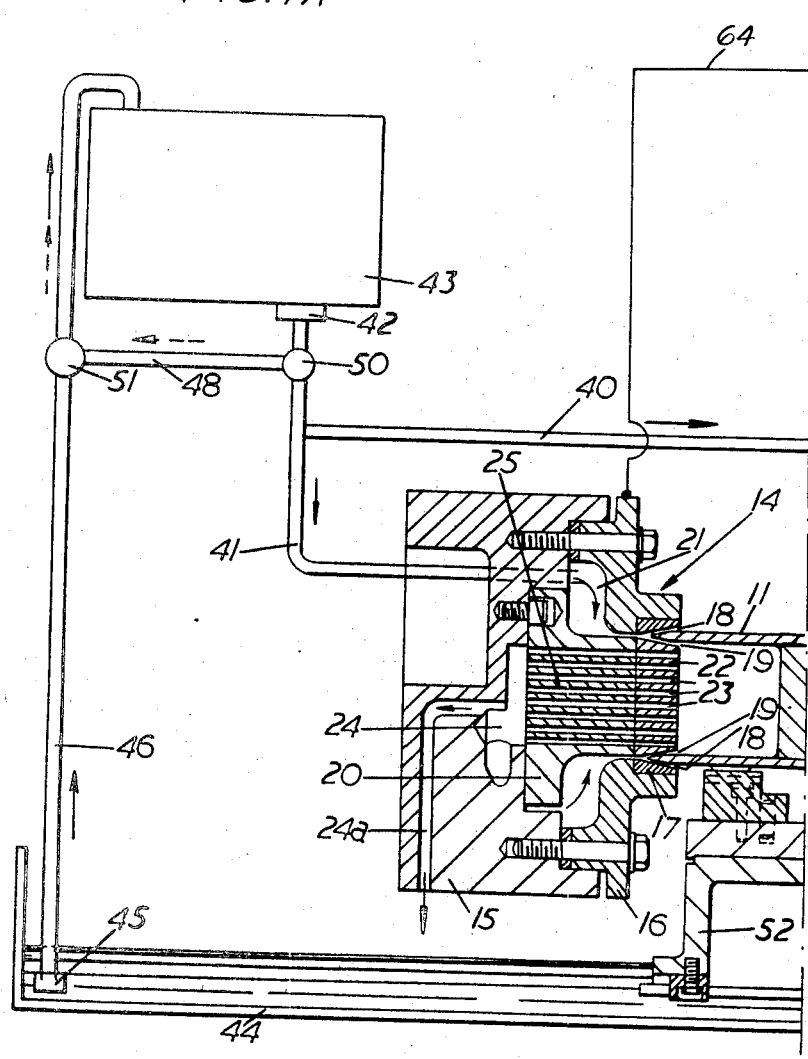
Figure 1B:
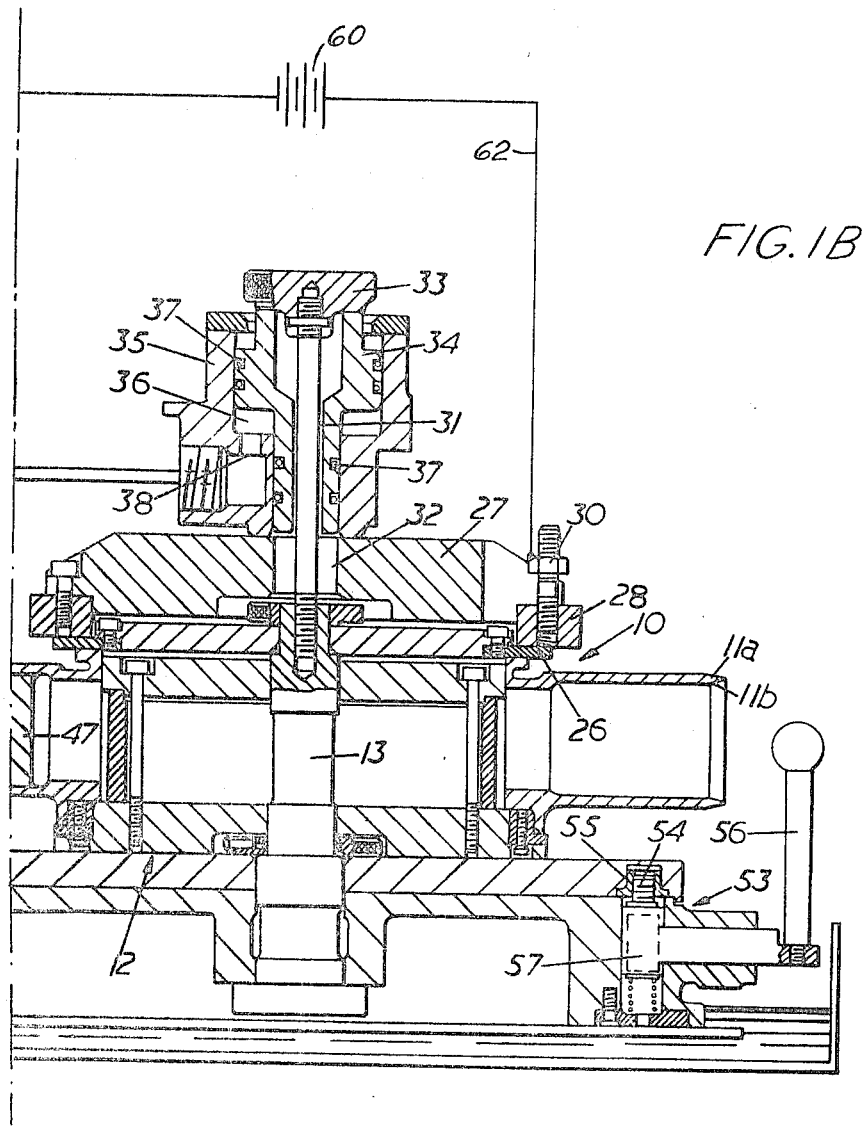

The invention will be described, by way of example only, with reference to the accompanying drawings in which FIGURE 1A is a diagrammatic sectional view of the left hand side of one embodiment of the invention, and FIGURE 1B is a diagrammatic sectional view of the right hand side of the embodiment of the invention.

The drawing illustrates apparatus for electrolytically machining a metal workpiece 10. In this example the workpiece 10 comprises a spoked member having a number of radially extending hollow spokes 11. It is desired to finish the radially outer and inner surfaces of the end of each spoke 11 in turn with a tapered external surface, as indicated at 11a, 11b respectively by means of electrolytic machining. The workpiece 10 is therefore rotatably mounted in a holder 12 which may be rotated on a vertical shaft 13 to bring each spoke 11 in turn into alignment with an electrolytic machining head 14.

The machining head 14 comprises a metal body 15 to which an annular metal cathode assembly 16 is bolted. The cathode assembly 16 is provided with an annular metal insert 17 which is so shaped as to give the desired shape to the external surface, 11a to be machined.

A plug 20 is attached to the body 15 of the machining head 14 and is disposed inwardly of the annular electrode assembly 16, being separated therefrom by an annular chamber 21. The plug 20 has mounted thereon a member 22, formed of the same metal as the insert 17, which is disposed radially opposite and inwardly of the insert 17 and which is so shaped as to give the desired shape to the internal surface, 11b to be machined. The member 22 is separated from the electrode 17 by a gap sufficient to admit the end of the spoke 11 to be machined, with clearance spaces 18, 19 between the surfaces of the insert 17 and the member 22 respectively. The member 22 is formed with a plurality of channels 23 which are open to the interior of the spoke 11 and which communicate with a common outlet chamber 24 via a plurality of drillings 25 in the plug 20.

An annular copper contact member 26 is secured to the shaft 13 and makes electrical contact with the workpiece 10. A movable clamping member 27 is mounted for movement in the direction of the shaft 13 relative to the contact member 26. The clamping member 27 carries an annular contact 28 which makes electrical contact with the contact member 26, said contact 28 carrying one or more electrical input terminals 30.

A spindle 31 is secured to the end of shaft 13 and is coaxial therewith. The spindle 31 passes through a central aperture 32 in the clamping member 27 and carries at its upper end a boss 33. A piston member 34 is journalled on the spindle 31 and is slidable thereon. The boss 33 acts as a stop for upward movement of the piston member 34 away from the clamping member 27.

The piston member 34 is a sliding fit in a cylinder block 35, the piston member 34 enclosing beneath it a space 36 within the cylinder block 35. Sealing rings 37 are provided on the piston member 34 on each side of the space 36. A port 38 in the wall of the cylinder block 35 provides access to the space 36 from a conduit, illustrated diagrammatically at 40.

The conduit 40 branches from a supply conduit, shown diagrammatically at 41, which is arranged to supply an electrolyte to the chamber 21 of the electrolytic machining head 14. Electrolyte under pressure is supplied to the conduits 41 and 40 by a pump 42 which in turn is supplied from a reservoir 43. Electrolyte passing through the supply conduit 41 passes into the chamber 21 and thence through the spaces 18, 19. The entire apparatus is mounted in a drain tank 44. A scavenge pump 45 is disposed in the drain tank 44 and is arranged to pump electrolyte therefrom through a scavenge conduit 46 into the reservoir 43. Alternatively, the reservoir 43 may be disposed below the level of the drain tank 44, so that electrolyte drains directly into the reservoir 43 under gravity without the necessity for scavenge pump 45.

During electrolytic machining, a direct current supply 60 is applied across the terminal or terminals 30 and the cathode assembly 16 via lines 62 and 64 respectively in such a manner that the workpiece 10 and the assembly 16 are respectively the positive and negative electrodes of an electrolytic cell, and electrolytic erosion of the workpiece 10 at the surfaces 11a, 11b will take place when electrolyte is supplied to the spaces 18, 19.

Electrolyte after passing through the spaces 18, 19 passes inwardly and outwardly of the spoke 11: that which passes outwardly (through the space 18) drains directly into the tank 44, while that which passes inwardly (through the space 19) is withdrawn from the interior of the spoke 11 through the channels 23, and drillings 25 to the outlet chamber 24. The drain outlet 24a from the chamber 24 allows electrolyte to pass from the outlet chamber 24 directly into the drain tank 44. To assist in controlling the flow of electrolyte through the machining head 14 a beexwax plug 47 is temporarily inserted in the spoke 11 which is being machined. The plug 47 blocks the passage which would otherwise exist through the spoke 11, compelling all electrolyte which passes into the interior of the spoke 11 to leave through the channels 23, thereby regulating the flow of electrolyte in a controlled manner.

At the same time as electrolyte is supplied to the conduit 41, electrolyte under pressure is also supplied through conduit 40 to the space 36 beneath the piston member 34. Since upward movement of the piston member 34 is prevented by the boss 33, the cylinder block 35 is urged downwardly under the pressure of the electrolyte, forcing the clamping member 27 downwardly on to the contact member 26. This, in addition to clamping the contact member 26, and therefore the workpiece 10, in position, also effects an electrical connection between the contact 28 and the contact member 26.

A by-pass conduit 48 connects the supply conduit 41, upstream of the junction thereof with conduit 40, with the scavenge conduit 46 via respective two-way valves 50, 51 provided in the conduit 41 and the conduit 46 respectively. The valves 50, 51 are operated in unison to enable the supply of electrolyte to conduits 40, 41 to be turned on or off without interrupting the operation of the pump 42. In the "on" position of the valves 50, 51 electrolyte flows from pump 42 into the conduits 40, 41, as indicated by full arrows, the conduit 48 being bypassed. In the "off" position of the valves 50, 51, electrolyte flows from the pump 42, through the by-pass conduit 48 and thence back to the reservoir 43 through part of the scavenge conduit 46, as indicated by broken arrows.

The work holder 12 and shaft 13 are supported for rotation on a table 52 which is mounted in the tank 44. When the machining of the spoke 11 is complete, the valves 50, 51 are turned to the "off" position, stopping the flow of electrolyte to the machining head 14 and simultaneously releasing the pressure in space 36 by way of conduits 40, 41 and chamber 21. The clamping member 27 is then no longer urged into engagement with the contact member 26, so that the work holder 12 and workpiece 10 may be rotated on the table 52. When the valves 50, 51 are turned to the "off" position, the electrical supply to the terminal 30 is interrupted, halting the electrolytic process.

The workpiece 10 is rotated through a predetermined angle so as to present the next spoke 11 for machining to the machining head 14. Locking means 53 are provided to lock the work holder 12 angularly with respect to the table 52 at each predetermined angular position of the workpiece 10. The locking means 53 comprises a peg 54 which is movable into and out of engagement with a respective recess 55 in the work holder 12 at each respective angular position. Movement of the peg 54 is effected by means of a manual lever 56 acting through a pion 57 on a rack (not shown) to which the peg 54 is attached.

The apparatus of this invention, by using the pressure of the electrolyte to actuate clamping means for the workpiece, enables the latter to be released for movement immediately the supply of electrolyte is cut off, without the necessity of undoing connections such as bolts which would otherwise be used to clamp the workpiece.

It will be appreciated that the method and apparatus according to the invention may be used to machine electrolytically surfaces of any given shape by employing a suitably shaped machining head 14.

An alternative embodiment of apparatus within the scope of this invention could, as will be readily understood, employ a movable machining electrode which is clamped relative to a workpiece at predetermined positions using the pressure of the electrolyte, in accordance with the method of the present invention, to clamp the electrode.

We claim:

1. A method of electrolytic machining comprising the steps of providing an electrode, positioning an electrically conductive member in spaced relation from said electrode to thereby define a machining gap with said member, supplying a working current to said member and said electrode, supplying electrolyte under pressure via a first conduit means to the space between the electrode and the member and supplying said electrolyte under pressure via a second conduit means to a clamping means so as to clamp said member in a predetermined position.

2. An apparatus for electrolytic machining comprising an electrode, means to support an electrically conductive member in spaced relation from said electrode to thereby define a machining gap with said member, electric power source means including means for supplying, in operation, a working current to said member and said electrode, first conduit means for supplying electrolyte under pressure to said machining gap, clamping means for clamping said support means in a predetermined position whereby to hold said member in said spaced relation with said electrode, pressure responsive means responsive to the pressure of the electrolyte, second conduit means, separate from said first conduit means, for supplying said electrolyte under pressure to said pressure responsive means so as to actuate in operation the said clamping means, in response to said pressure of the electrolyte.

3. Apparatus as claimed in claim 2 wherein a common source of electrolyte under pressure is provided for connection to said first and second supply means.

4. Apparatus as claimed in claim 2 wherein the pressure responsive means comprises a relatively movable piston and cylinder, the interior of the cylinder being connected to said means for supplying electrolyte under pressure, and a stop for preventing movement of the piston away from said one electrode, the cylinder being adapted, on said relative movement thereof, to actuate said clamping means.

5. Apparatus as claimed in claim 2 including means for withdrawing electrolyte from said electrolytic machining head, said means comprising an insulating member having a plurality of channels therein.

6. Apparatus as claimed in claim 5 including a fluid circuit for circulating electrolyte, said circuit comprising said electrolyte supply means, said electrolyte withdrawal means, a by-pass conduit, and a valve operative to divert electrolyte through said by-pass conduit without passing through said electrolytic machining head or to said pressure responsive means when it is desired to stop operation of the apparatus.

7. Apparatus as claimed in claim 2 wherein said clamping means is adapted to engage a workpiece to be machined, said workpiece constituting the said one electrode.

8. An apparatus for electrolytic machining comprising an electrode, means to support an electrically conductive member in spaced relation from said electrode to thereby define a machining gap with said member, a member rigidly retained to said electrode, an electrical power supply means for supplying, in operation, a working current to said member and said electrode, first conduit means for supplying said electrolyte under pressure to said machining gap, clamping means for clamping said member in a predetermined position, pressure responsive means responsive to the pressure of said electrolyte, second conduit means, separate from said first conduit means, for supplying said electrolyte under pressure to said pressure responsive means so as to actuate in operation the said clamping means, in response to said pressure of said electrolyte.

References Cited

UNITED STATES PATENTS

| 1,685,572 | 9/1928 | Onsrud | 269—25 |
| 3,338,808 | 8/1967 | Johnson | 204—143 |
| 3,342,477 | 9/1967 | Torossian | 269—25 |

ROBERT K. MIHALEK, Primary Examiner

U.S. Cl. X.R.

204—224, 297; 269—25